(12) United States Patent
Stoppelberg

(10) Patent No.: US 7,735,454 B1
(45) Date of Patent: Jun. 15, 2010

(54) DISPENSER-TUBE DEER FEEDER

(76) Inventor: Roger Stoppelberg, P.O. Box 144, Paige, TX (US) 78653

( * ) Notice: Subject to any disclaimer, the term of this patent is extended or adjusted under 35 U.S.C. 154(b) by 687 days.

(21) Appl. No.: 11/788,937

(22) Filed: Apr. 23, 2007

(51) Int. Cl.
*A01K 5/00* (2006.01)

(52) U.S. Cl. .................... 119/52.4; 119/57.91

(58) Field of Classification Search ............... 119/52.4, 119/57.91, 57.92, 52.1, 52.2, 52.3, 57.9
See application file for complete search history.

(56) References Cited

U.S. PATENT DOCUMENTS

| | | | | |
|---|---|---|---|---|
| 4,582,023 A * | 4/1986 | Zumbahlen et al. | ........ | 119/53.5 |
| 4,945,859 A | 8/1990 | Churchwell | ............... | 119/57.91 |
| 4,966,098 A * | 10/1990 | Freeman | .................... | 119/52.2 |
| 5,143,022 A | 9/1992 | Fore | ........................ | 119/51.03 |
| 5,794,561 A | 8/1998 | Schultz | ..................... | 119/52.1 |
| 6,199,509 B1 | 3/2001 | Mostyn et al. | ............ | 119/51.01 |
| 6,363,887 B1 | 4/2002 | Davis | ....................... | 119/52.1 |
| 6,481,374 B1 * | 11/2002 | Lillig | ........................ | 119/52.1 |
| 6,557,598 B2 | 5/2003 | Glover et al. | ............... | 141/387 |
| 6,814,029 B1 | 11/2004 | Chesser | .................... | 119/57.91 |
| 6,990,925 B2 | 1/2006 | Banks et al. | ............... | 119/61.3 |
| 7,302,912 B2 * | 12/2007 | Boyer | ....................... | 119/57.91 |
| 7,631,614 B2 * | 12/2009 | Romeu Guardia | ........... | 119/54 |

* cited by examiner

*Primary Examiner*—Yvonne R. Abbott
(74) *Attorney, Agent, or Firm*—Derek R. Van Gilder

(57) ABSTRACT

A dispenser-tube deer feeder having a feeder tube (1), a feeder lid (2), a feeder wall (3) and a feeder floor (4) has at least one dispenser tube (5) sized to receive a deer snout, but not larger animal snouts. The dispenser tube is extended laterally from the feeder tube proximate the feeder floor. A dispenser (13, 18, 19) in conveyance communication from the feeder tube to the dispenser tube can be structured for allowing select constituencies of granular or liquid feed to be dispensed into the dispenser tube for deer to eat. A positioner (29, 30, 31,) is provided for positioning the dispenser tube a predetermined distance above a ground surface for access by deer but not shorter animals with snouts the same size or smaller than deer snouts. At least one positioner attachment (10, 25) is provided for attaching the feeder tube to a central post, a side post or an overhanging tree or structure.

20 Claims, 5 Drawing Sheets

DISPENSER-TUBE DEER FEEDER

BACKGROUND OF THE INVENTION

1. Field of the Invention

This invention relates to deer feeders and in particular to a deer feeder having a dispenser tube structured for dispensing a varied selection of deer feed and for allowing entry of a deer snout but not larger animal snouts to access the varied selection of deer feed.

2. Relation to Prior Art

There are a plurality of known deer feeders, but none with one or more dispenser tubes structured for dispensing a varied selection of deer feed and positioned for allowing entry of a deer snout but not snouts of larger animals like cows and horses or shorter animals like sheep and goats in a manner taught by this invention.

Related but different prior art is known to include the following:

| U.S. Pat. No. | Inventor | Date |
| --- | --- | --- |
| U.S. Pat. No. 4,945,859 | Churchwell | Aug. 7, 1990 |
| U.S. Pat. No. 5,143,022 | Force | Sep. 1, 1992 |
| U.S. Pat. No. 5,794,561 | Schulz | Aug. 18, 1998 |
| U.S. Pat. No. 6,199,509 B1 | Mostyn et al. | Mar. 13, 2001 |
| U.S. Pat. No. 6,363,887 B1 | Davis | Apr. 2, 2002 |
| U.S. Pat. No. 6,481,374 B1 | Lillig | Nov. 19, 2002 |
| U.S. Pat. No. 6,557,598 B2 | Glover et al. | May 6, 2003 |
| U.S. Pat. No. 6,814,029 B1 | Chesser | Nov. 9, 2004 |
| U.S. Pat. No. 6,990,925 B2 | Banks et al. | Jan. 31, 2006 |

SUMMARY OF THE INVENTION

Objects of patentable novelty and utility taught by this invention are to provide a dispenser-tube deer feeder which:

dispenses feed to only deer;

is adaptable to dispensing multiple varieties of granular or liquid feed;

dispenses the feed only as eaten by the deer;

keeps the feed clean and free from contamination;

prevents access by rodents, birds and other small animals; and can be positioned optionally on fence posts, positioning posts or trees.

This invention accomplishes these and other objectives with a dispenser-tube deer feeder having a feeder tube, a feeder lid, at least one feeder wall and a feeder floor. The feeder tube has at least one dispenser tube sized to receive a deer snout, but not larger animal snouts. The dispenser tube is extended laterally from the feeder tube proximate the feeder floor. A dispenser in conveyance communication from the feeder tube to the dispenser tube can be structured for allowing select constituencies of granular or liquid feed to be dispensed into the dispenser tube for deer to eat. A positioner is provided for positioning the dispenser tube a predetermined distance above a ground surface for access by deer but not shorter animals with snouts the same size or smaller than deer snouts. At least one positioner attachment is provided for attaching the feeder tube to a central post, a side post or an overhanging tree or other object.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

A description of a preferred embodiment of this invention has numbered terms which designate its features with the same numbers on the drawings and in parentheses throughout the description and throughout the patent claims.

Figure 1:
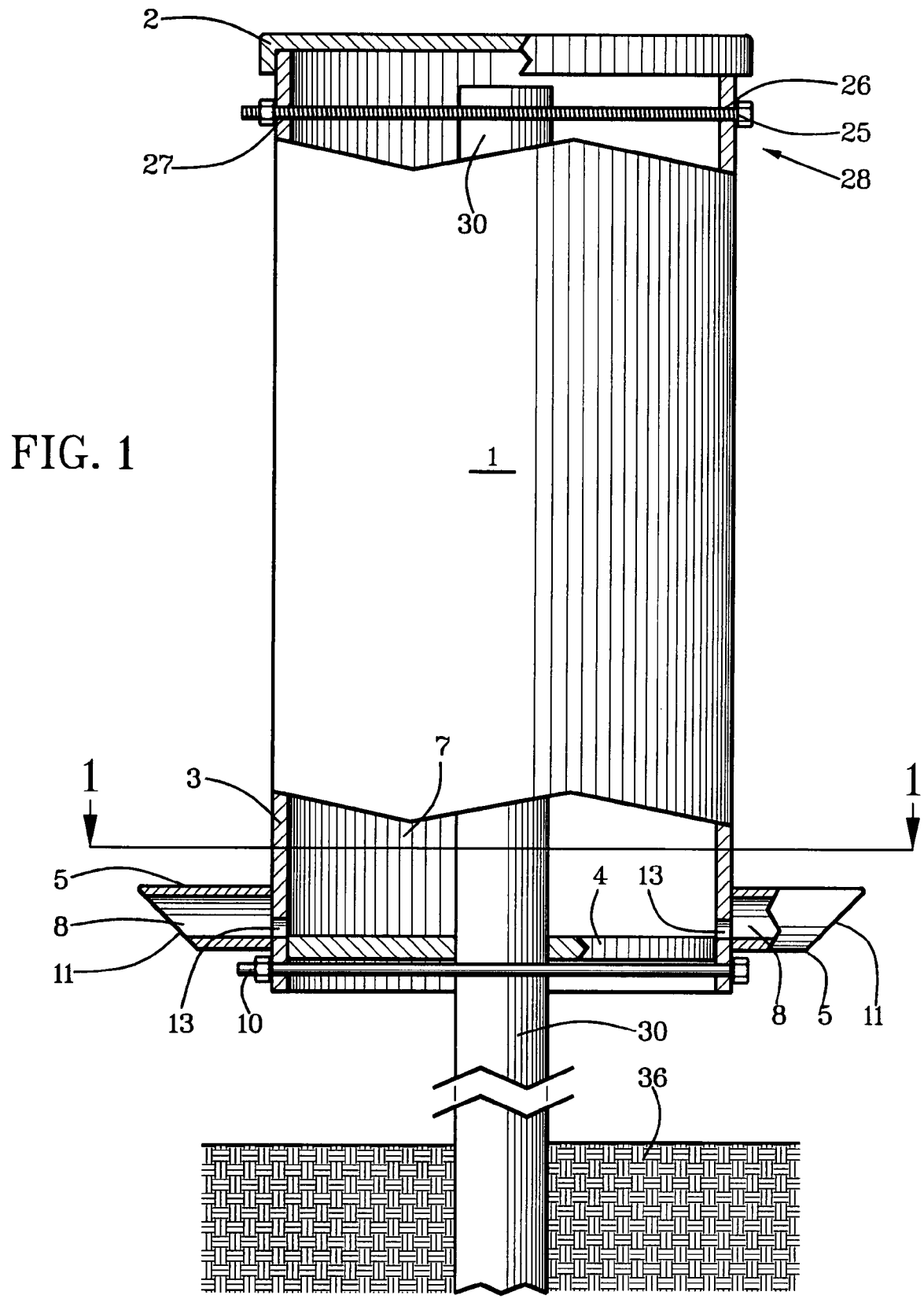
FIG. 1 is a partially cutaway side view of the feeder tube positioned by a center post.
Figure 2:
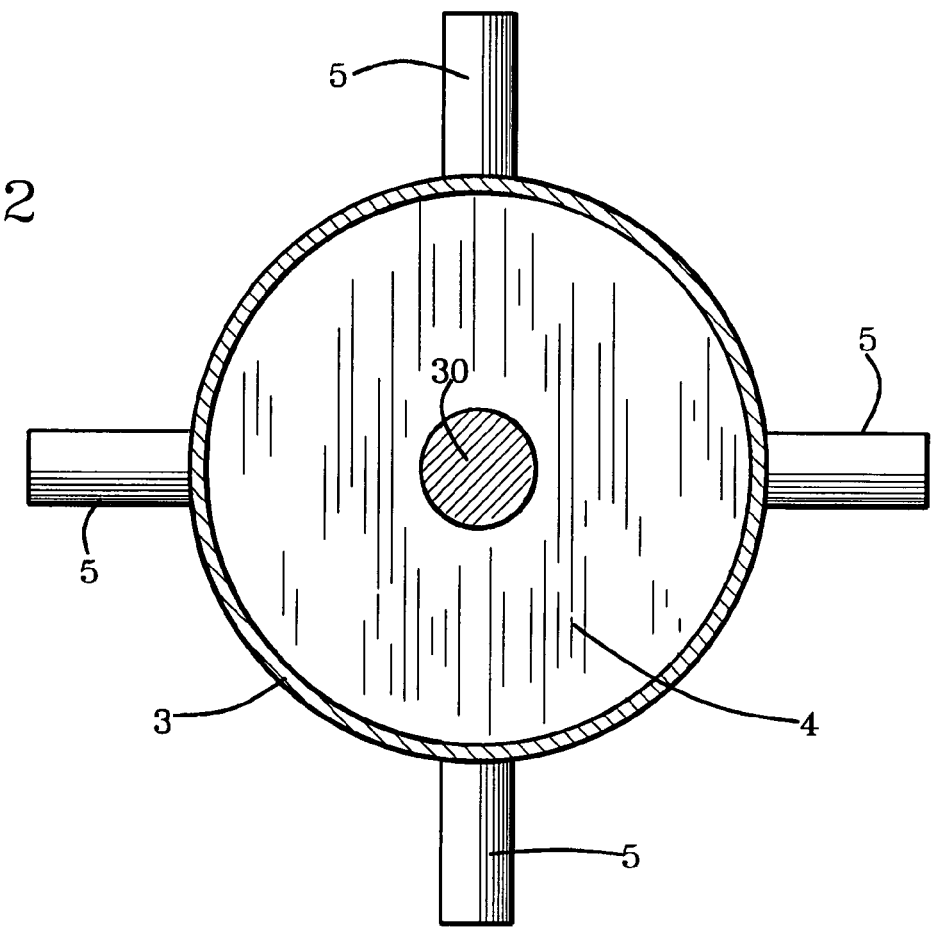
FIG. 2 is a cross-sectional top view through section line 1 of FIG. 1 showing the feeder tube with four dispenser tubes.

Referring to FIGS. 1-2, the dispenser-tube deer feeder has a feeder tube (1) with a feeder lid (2), at least one feeder wall (3) and a feeder floor (4). At least one dispenser tube (5) sized to receive a predetermined portion of a deer snout is extended laterally from the feeder tube (1) predeterminedly proximate the feeder floor (4). A dispenser is in predetermined feed-dispense conveyance intermediate a feeder-tube interior (7) and a dispenser-tube interior (8).

At least one positioner attachment, which can include a top bolt (25), is structured for attachment of the feeder tube (1) to a positioner, which can include a center post (30), for positioning the feeder tube (1) predeterminedly above a ground surface (36). The positioner can be made to position the feeder tube (1) and dispenser tube (5) at select heights for different types of deer. Western US deer, for instance, are taller than Eastern US deer and some other smaller deer for requiring higher positioning with the positioner.

The feeder tube (1) has an interior width within a range of eight inches and twenty-four inches and an interior length within a range of twelve inches and seventy-two inches.

The dispenser tube (5) has an interior width predeterminedly proximate a width of an adult deer snout for receiving a predetermined length of a deer snout while preventing entry of larger snouts of animals. The dispenser tube (5) has an interior length predeterminedly proximate the predetermined length of the deer snout receivable by the dispenser tube (5) for allowing entry of the deer snout to a predetermined distance into the dispenser tube (5).

Preferably, the interior width of the dispenser tube (5) is approximately two-and-three-eighths inches and the interior length of the dispenser tube (5) is approximately three-and-one-half inches.

The dispenser tube (5) can have a slant end (11) with an approximately forty-five-degree slant inwardly and downwardly from a top side of the dispenser tube (5).

Figure 3:
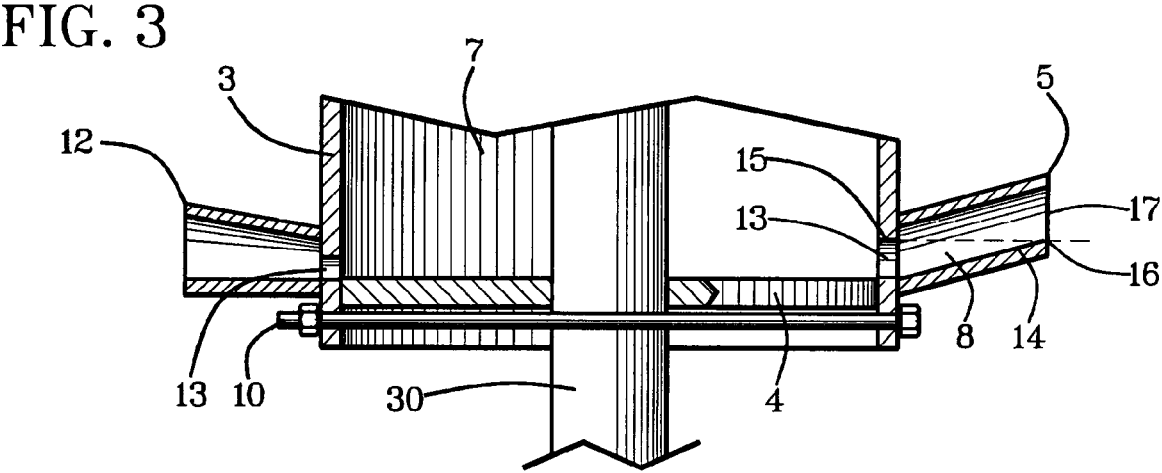
FIG. 3 is a partially cutaway side view of a bottom portion of the feeder tube having a taper-wall tube on one side and an up-slanted dispenser tube on a second side.

Referring to FIG. 3, the dispenser tube (5) includes a tapered-wall tube (12) with an approximately ten-degree angle of taper downwardly from an outside end of the dispenser tube (5). The dispenser includes a dispenser orifice (13) having a cross-sectional area sized for allowing a predetermined flow rate of a predetermined consistency of deer feed intermediate the feeder-tube interior (7) and the dispenser-tube interior (8). The dispenser orifice (13) can have a cross-sectional area of approximately one square inch.

The dispenser tube (5) can be up-slanted laterally with a predetermined upward degree of slant for positioning a bottom interior wall (14) to restrict lateral flow of deer feed predeterminedly prior to being eaten by deer. Preferably, the dispenser orifice (13) is sized and positioned and laterally upward slant of the dispenser tube (5) is predetermined for having an orifice top (15) horizontal to an orifice bottom (16) of a tube entrance (17) to the dispenser tube (5).

Figure 4:
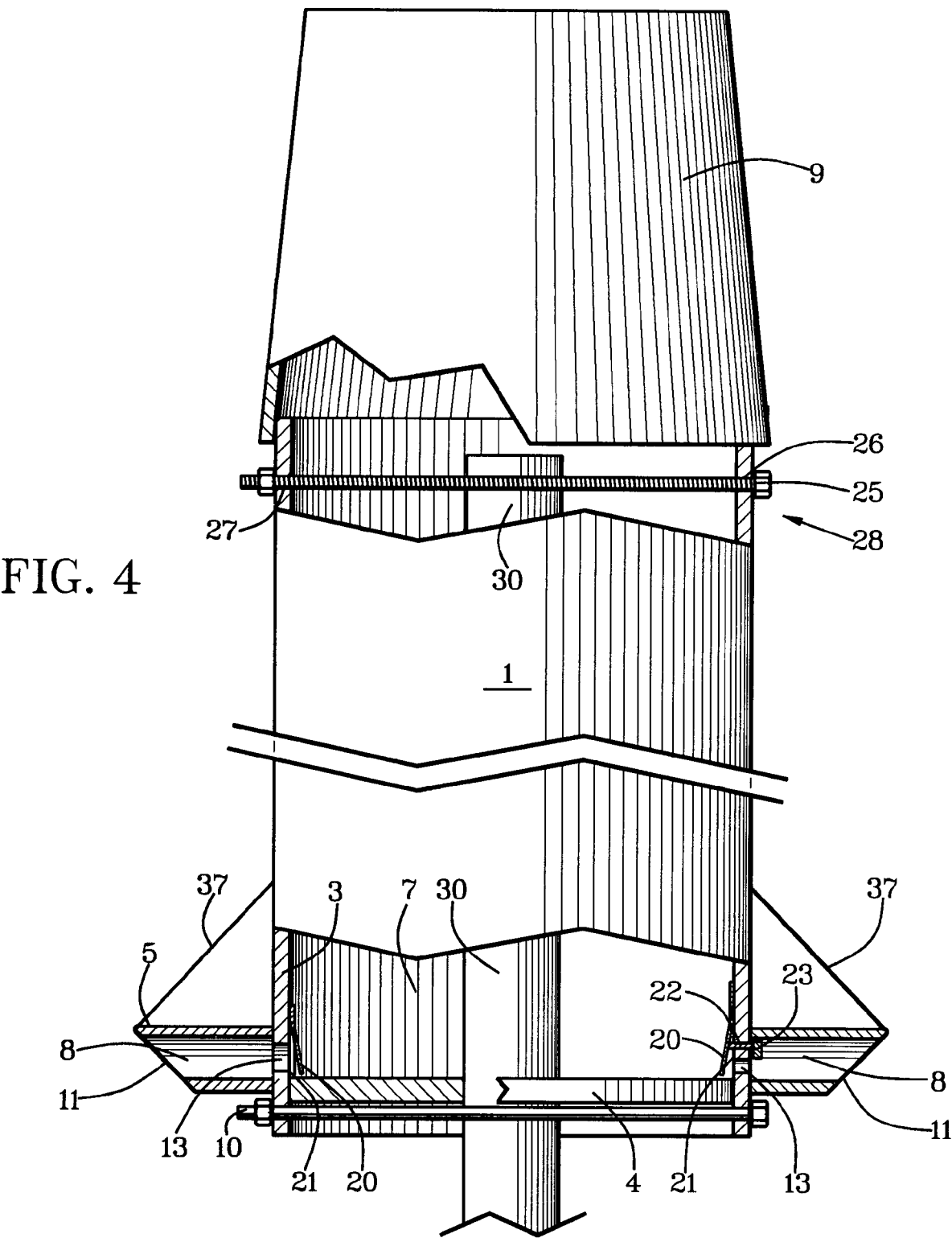
FIG. 4 is a partially cutaway side view of the feeder tube with a bucket lid and having a flapper valve for controlling flow of liquid feed on a first side and the flapper valve with a valve opener and an opening restriction on a second side.
Figure 5:
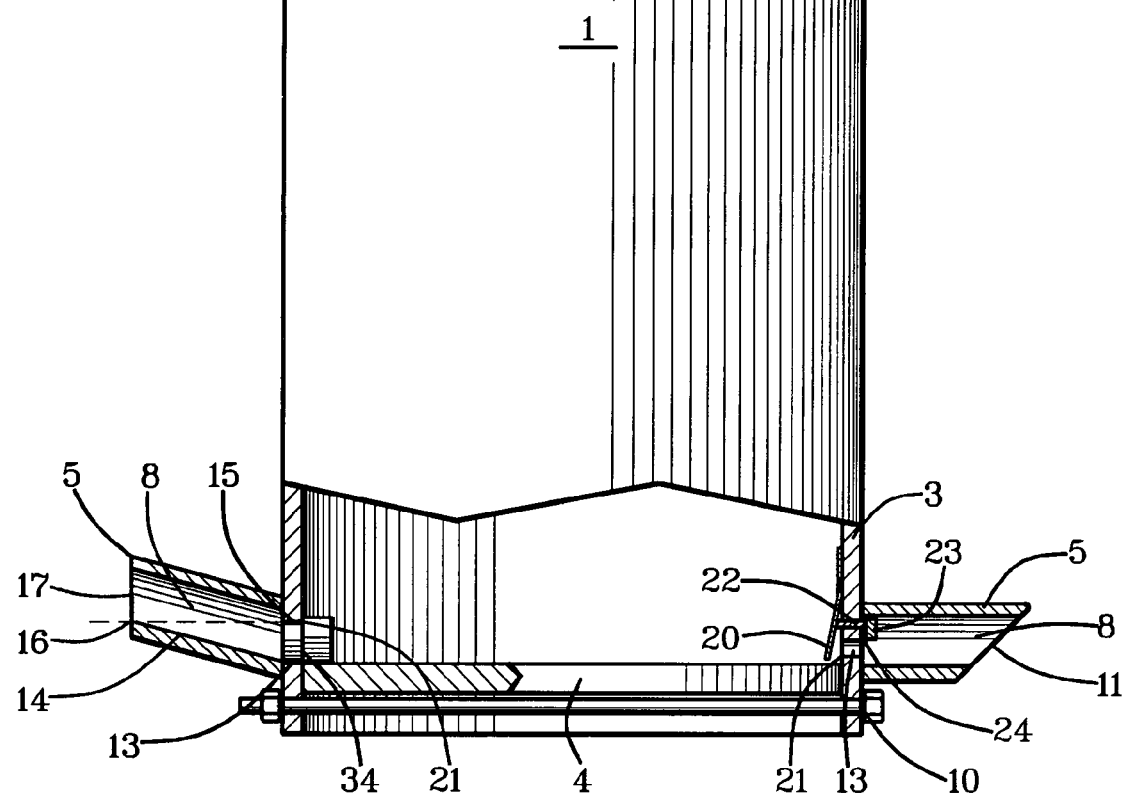
FIG. 5 is a partially cutaway side view of the feeder tube positioned by a hanger and having the up-slanted dispenser tube plugged on a first side and the flapper valve with the valve opener and the opening restriction on a second side.
Figure 6:
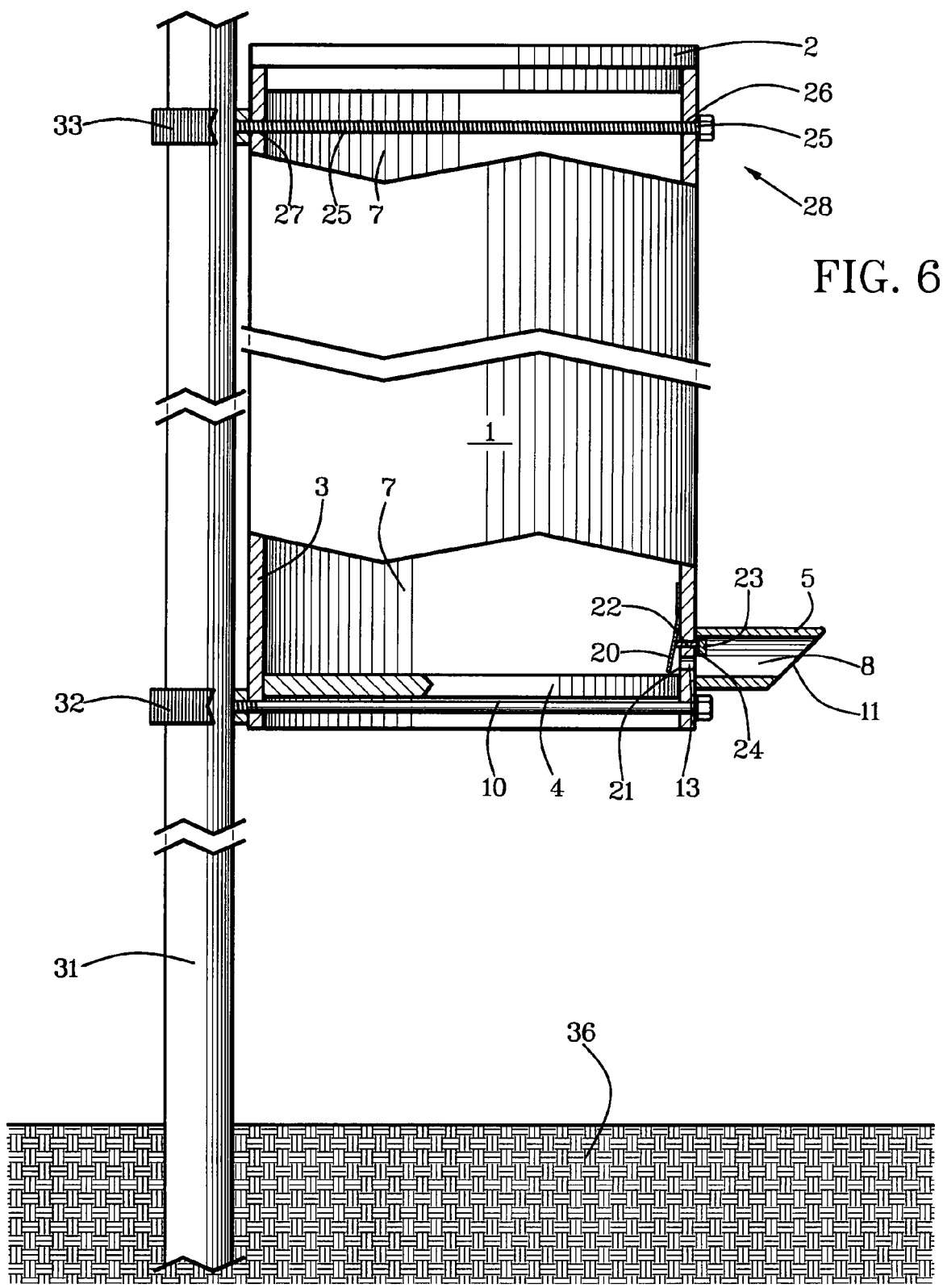
FIG. 6 is a partially cutaway side view of the feeder tube positioned by a side post and having the flapper valve with the valve opener and the opening restriction.

Referring to FIGS. 4-6, the dispenser includes a liquid dispenser for dispensing predeterminedly viscose molasses and other syrupy liquid.

For the liquid dispenser, the dispenser orifice (13) can have a cross-sectional area sized for allowing a predetermined rate of flow of fluid having a predetermined viscosity.

Preferably, a flapper valve (20) is spring-pressured against an inside wall (21) of the feeder tube (1) surrounding the dispenser orifice (13) for preventing flow of the liquid through the dispenser orifice (13) with the flapper valve (20) being in a closed mode against the inside wall (21). A valve opener (22) can be extended from the flapper valve (20) slidably through the feeder wall (3) and into the feeder-tube interior (7). The valve opener (22) is shaped and positioned for being pushed by a deer snout for opening the flapper valve (20). The valve opener (22) can have an opening restriction (23) sized and positioned to contact an outside wall (24) of the of the feeder tube (1) surrounding the dispenser orifice (13) for preventing excessive flow of the fluid through the dispenser orifice (13) with the flapper valve (20) being in an open mode.

A rodent guard (37) can be positioned on top of either or all forms of the dispenser tube (5). The rodent guard (37) can be a 45-degree or more steeply upward slanted member above the dispenser tube (13) intermediate an outside end of the dispenser tube (13) and a higher portion of the feeder tube (1).

Referring generally to FIGS. 1-6, the positioner attachment includes a top bolt (25) positioned in a first top-bolt hole (26) in a first side of a top portion of the feeder tube (1) and in a second top-bolt hole (27) in a second side of the feeder tube (1) predeterminedly near a feeder top (28) of the feeder tube (1).

The positioner can include the hanger (29) attached to opposite ends of the top bolt (25) for hanging the feeder tube (1) from a desired tree limb, cross member or other object.

The positioner can include the center post (30) positioned rigidly upright beneath the feeder tube (1), extended in a predeterminedly sealed condition through the feeder floor (4) and attached rigidly to the top bolt (25) at a central position intermediate the first top-bolt hole (26) and the second top-bolt hole (27). The center post (30) can be round, rectangular, angled or otherwise shaped metal, plastic, wood or other material appropriate for a selected post structure. A preferred structure for rigid positioning of the center post (30) intermediate opposite sides of the feeder tube (1) includes at least half-length threading of the top bolt (25) and matched threading of the center post (30) with the top bolt (25) being screwed through the threading of the center post (30).

Referring to FIG. 5, the positioner includes a side post (31) which can be a fence post, tree or other object positioned upright beside the feeder tube (1). The feeder tube (1) is attached rigidly to the side post (31) with a bottom side-post attachment (32) and a top side-post attachment (33).

Referring to the FIGS generally, a method has the following steps for making a dispenser-tube deer feeder:

providing a feeder tube (1) having an interior width of eight-to-twenty-four inches and a length of twelve-to-seventy-two inches with a feeder lid (2) and a feeder floor (4);

positioning at least one a dispenser tube (5) laterally proximate the feeder floor (4);

the dispenser tube (5) having a dispenser-tube interior (8) with an interior width of approximately two-and-three-eighths inches and a length within a range of 3-to-5 inches;

positioning a dispenser orifice (13) having a predetermined cross-sectional area in conveyance communication intermediate the feeder-tube interior (7) and the dispenser-tube interior (8) for allowing a predetermined flow of selected deer feed through the dispenser orifice (13); and positioning the feeder tube (1) on a positioner at a height predeterminedly above ground (36) surface for deer to access the dispenser tube (5) and high enough above the ground (36) surface for inaccessibility of the dispenser tube (5) to animals shorter than deer but having equal-to-smaller snouts.

The method further includes:

making the at least one dispenser tube (5) to slant upward predeterminedly for positioning a bottom interior wall (14) of the dispenser tube (5) for inhibiting flow of selected deer feed through the dispenser orifice (13) with an orifice top (15) of the dispenser orifice (13) being approximately parallel to an orifice bottom (16) of a tube entrance (17) to the dispenser tube (5).

The method further includes:

making the dispenser orifice (13) to have a cross-sectional area sized for allowing a predetermined flow of predeterminedly viscose liquid feed through the dispenser orifice (13) intermediate the feeder-tube interior (7) and the dispenser-tube interior (8); and spring-positioning a flapper valve (20) against an interior wall of the feeder tube (1) surrounding the dispenser orifice (13) for preventing flow through the dispenser orifice with the flapper valve (20) being in a closed position against the feeder-tube interior (7).

The method further includes:

extending a valve opener (22) slidably through a wall of the feeder tube (1) from the flapper valve (20) to an opening restriction (23) sized and shaped for being pushed by a deer snout or tongue in the dispenser-tube interior (8) for opening the flapper valve (20) and for contacting an outside surface of the feeder tube (1) by the opening restriction (23) for preventing excessive flow of liquid feed through the dispenser orifice (13) predeterminedly.

The method further includes:

making the dispenser orifice (13) to have a circular cross-sectional area appropriate for allowing entry of a deer tongue to push the flapper valve open predeterminedly. Preferably, the dispenser orifice (10) has a two-inch diameter opening.

This dispenser-tube deer feeder can be made with options that include but are not limited to the following. The feeder lid (4) can be an inverted bucket (9) as shown in FIG. 4. The feeder lid also can be either overhung as shown in FIG. 1 or stepped internally as shown in FIGS. 5-6. The feeder tube (1) can be a suitably thick-walled plastic pipe, clay pipe, metal pipe or corrugated culvert pipe. The dispenser tubes (5) can be suitably thick-walled plastic, clay or metal. The feeder floor (4) can be wood, plywood, plastic, clay or metal. Other materials also can be used. The feeder tube (1) can be round, square or other shape. The positioner can be a tree, an overhang member, a fence post, a rod with a desired cross-sectional shape, or any of a selection of pound-in or cement-in posts.

Selected embodiments of the dispenser-tube deer feeder can be used interchangeably with optional feature variations for dispensing various selections of granular or liquid deer feed. Optionally also, a plurality of different dispenser features can be employed on a single feeder tube (1) as shown in FIG. 5. Merit of this invention includes the feeder tube (1) with the dispenser tube (5) having selectivity of feed for feeding deer, selectivity of dispensing deer feed and selectivity of positioning the dispenser-tube deer feeder.

A new and useful dispenser-tube deer feeder having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A dispenser-tube deer feeder comprising:
a feeder tube (1) having a feeder lid (2), at least one feeder wall (3) and a feeder floor (4);
at least one dispenser tube (5) sized to receive a predetermined portion of a deer snout;
the at least one dispenser tube (5) being extended laterally from the feeder tube (1) predeterminedly proximate the feeder floor (4);
a dispenser in predetermined feed-dispense conveyance intermediate a feeder-tube interior (7) and a dispenser-tube interior (8);
at least one positioner attachment structured for attachment of the feeder tube (1) to a positioner for positioning the feeder tube (1) predeterminedly above a ground surface;
the feeder tube (1) has an interior width within a range of eight inches and twenty-four inches;
the feeder tube (1) has an interior length within a range of twelve inches and seventy-two inches;
the dispenser tube (5) has an interior width predeterminedly proximate a width of an adult deer snout for receiving a predetermined length of a deer snout while preventing entry of larger snouts of animals;
the dispenser tube (5) has an interior length predeterminedly proximate a length of the deer snout receivable by the dispenser tube (5) for allowing entry of the deer snout to a predetermined distance from the dispenser (6); and
the dispenser is structured for allowing a predeterminedly controlled rate of flow of a predetermined deer feed intermediate the feeder-tube interior (7) and the dispenser-tube interior (8).

2. The apparatus of claim 1 in which:
the interior width of the dispenser tube (5) is approximately two-and-three-eighths inches.

3. The apparatus of claim 1 in which:
the interior length of the dispenser tube (5) is approximately three-and-one-half inches; and
a rodent guard (37) having an approximate width of the dispenser tube (5) is positioned on top of the dispenser tube (5) with at least a forty-five-degree slant upward intermediate an outside end of the dispenser tube (5) and the feeder tube (1).

4. The apparatus of claim 1 in which:
the dispenser tube (5) has a slant end (11) with an approximately forty-five-degree slant inwardly and downwardly from a top side of the dispenser tube (5).

5. The apparatus of claim 1 in which:
the dispenser tube (5) is a tapered-wall tube (12) with an approximately ten-degree angle of taper downwardly from an outside end of the dispenser tube (5).

6. The apparatus of claim 1 in which:
the dispenser is a dispenser orifice (13) having a cross-sectional area sized for allowing a predetermined flow rate of a predetermined consistency of deer feed intermediate the feeder-tube interior (7) and the dispenser-tube interior (8).

7. The apparatus of claim 6 in which:
the dispenser is the dispenser orifice (13) having the cross-sectional area sized for allowing the predetermined flow rate of a predetermined granular consistency of deer feed intermediate the feeder-tube interior (7) and the dispenser-tube interior (8).

8. The apparatus of claim 7 in which:
the cross-sectional area of the dispenser orifice (13) is approximately one square inch.

9. The apparatus of claim 6 in which:
the dispenser tube (5) is slanted laterally upward with a predetermined upward degree of slant for positioning a bottom interior wall (14) to restrict lateral flow of deer feed through the dispenser orifice (13) predeterminedly prior to being eaten by deer.

10. The apparatus of claim 9 in which:
the dispenser orifice (13) is sized and positioned and the laterally upward slant of the dispenser tube (5) is predetermined for having an orifice top (15) horizontal to an orifice bottom (16) of a tube entrance (17) to the dispenser tube (5).

11. The apparatus of claim 1 in which:
the dispenser is a liquid dispenser for dispensing predeterminedly viscose molasses and other syrupy liquid.

12. The apparatus of claim 11 in which:
the dispenser orifice (13) has a cross-sectional area for allowing a predetermined rate of flow of fluid having a predetermined viscosity;
a flapper valve (20) is spring-pressured against an inside wall (21) of the feeder tube (1) surrounding the dispenser orifice (13) for preventing flow of the liquid with the flapper valve (20) being in a closed mode against the inside wall (21);
a valve opener (22) is extended from the flapper valve (20) slidably through the feeder wall (3) and into the feeder-tube interior (7);
the valve opener (22) is shaped and positioned for being pushed by a deer snout for opening the flapper valve (20); and
the valve opener (22) has an opening restriction (23) sized and positioned to contact an outside wall (24) of the of the feeder tube (1) surrounding the dispenser orifice (13) for preventing excessive flow of the fluid with the flapper valve (20) being in an open mode.

13. The apparatus of claim 1 in which:
the positioner attachment is a top bolt (25) positioned in a first top-bolt hole (26) in a first side of a top portion of the feeder tube (1) and in a second top-bolt hole (27) in a second side of the feeder tube (1) predeterminedly near a feeder top (28) of the feeder tube (1); and
the positioner is a hanger (29) attached to opposite ends of the top bolt (25) for hanging the feeder tube (1) from a desired tree limb, cross member or other object.

14. The apparatus of claim 1 in which:
the positioner attachment is the top bolt (25) positioned in the first top-bolt hole (26) in the first side of the top portion of the feeder tube (1) and in the second top-bolt hole (27) predeterminedly near the feeder top (28) of the feeder tube (1); and the positioner is a center post (30) positioned rigidly upright beneath the feeder tube (1), extended through the feeder floor (4) and attached rigidly to the top bolt (25) at a central position intermediate the first top-bolt hole (26) and the second top-bolt hole (27).

15. The apparatus of claim 1 in which:

the positioner attachment is the top bolt (25) positioned in the first top-bolt hole (26) in the first side of the top portion of the feeder tube (1) and in the second top-bolt hole (27) predeterminedly near the feeder top (28) of the feeder tube (1); and the positioner is a side post (31) positioned upright beside the feeder tube (1), attached rigidly to the top bolt (25) and attached rigidly to a bottom portion of the feeder tube (1).

16. A method comprising the following steps for making a dispenser-tube deer feeder:

providing a feeder tube (1) having an interior width of eight-to-twenty-four inches and a length of twelve-to-seventy-two inches with a feeder lid (2), at least one feeder wall (3) and a feeder floor (4);

positioning at least one dispenser tube (5) laterally on the feeder tube (1) at predeterminedly proximate the feeder floor (4);

the dispenser tube (5) having a dispenser-tube interior (8) with an interior width of approximately two-and-three-eighths inches and a length within a range of three-to-five inches;

positioning a dispenser orifice (13) having a predetermined cross-sectional area in conveyance communication intermediate a feeder-tube interior (7) and a dispenser-tube interior (8) for allowing a predetermined flow of deer feed through the dispenser orifice (13); and positioning the feeder tube (1) on a positioner at a height predeterminedly above ground surface for deer to access the dispenser tube (5) and high enough above the ground surface for inaccessibility of the dispenser tube (5) to animals shorter than deer but having equal-to-smaller snouts.

17. The method of claim 16 and further comprising:

making the at least one dispenser tube (5) to slant upward predeterminedly for positioning a bottom interior wall (14) of the dispenser tube (5) predeterminedly higher vertically than an orifice top (15) of the dispenser orifice (13) for inhibiting flow of deer feed through the dispenser orifice (13) predeterminedly.

18. The method of claim 16 and further comprising:

making the dispenser orifice (13) to have a cross-sectional area sized for allowing a predetermined flow of predeterminedly viscose liquid feed through the dispenser orifice (13) intermediate the feeder-tube interior (7) and the dispenser-tube interior (8); and spring-positioning a flapper valve (20) against an inside wall (21) of the feeder tube (1) surrounding the dispenser orifice (13) for preventing flow through the dispenser orifice (13) with the flapper valve (20) being in a closed position against the inside wall (21).

19. The method of claim 18 and further comprising:

making the dispenser orifice (13) to have a cross-sectional area sized and shaped for allowing entry of a deer tongue to push the flapper valve open predeterminedly.

20. The method of claim 19 and further comprising:

extending a valve opener (22) slidably through a wall of the feeder tube (1) from the flapper valve (20) to an opening restriction (23) sized and shaped for being pushed by a deer snout or tongue in the dispenser-tube interior (8) for opening the flapper valve (20) and for contacting an outside surface of the feeder tube (1) by the opening restriction (23) for preventing excessive flow of liquid feed through the dispenser orifice (13) predeterminedly.

* * * * *